Sept. 4, 1945.  W. A. LEBUS  2,384,319
PROJECTOR
Filed Nov. 9, 1942  8 Sheets-Sheet 1
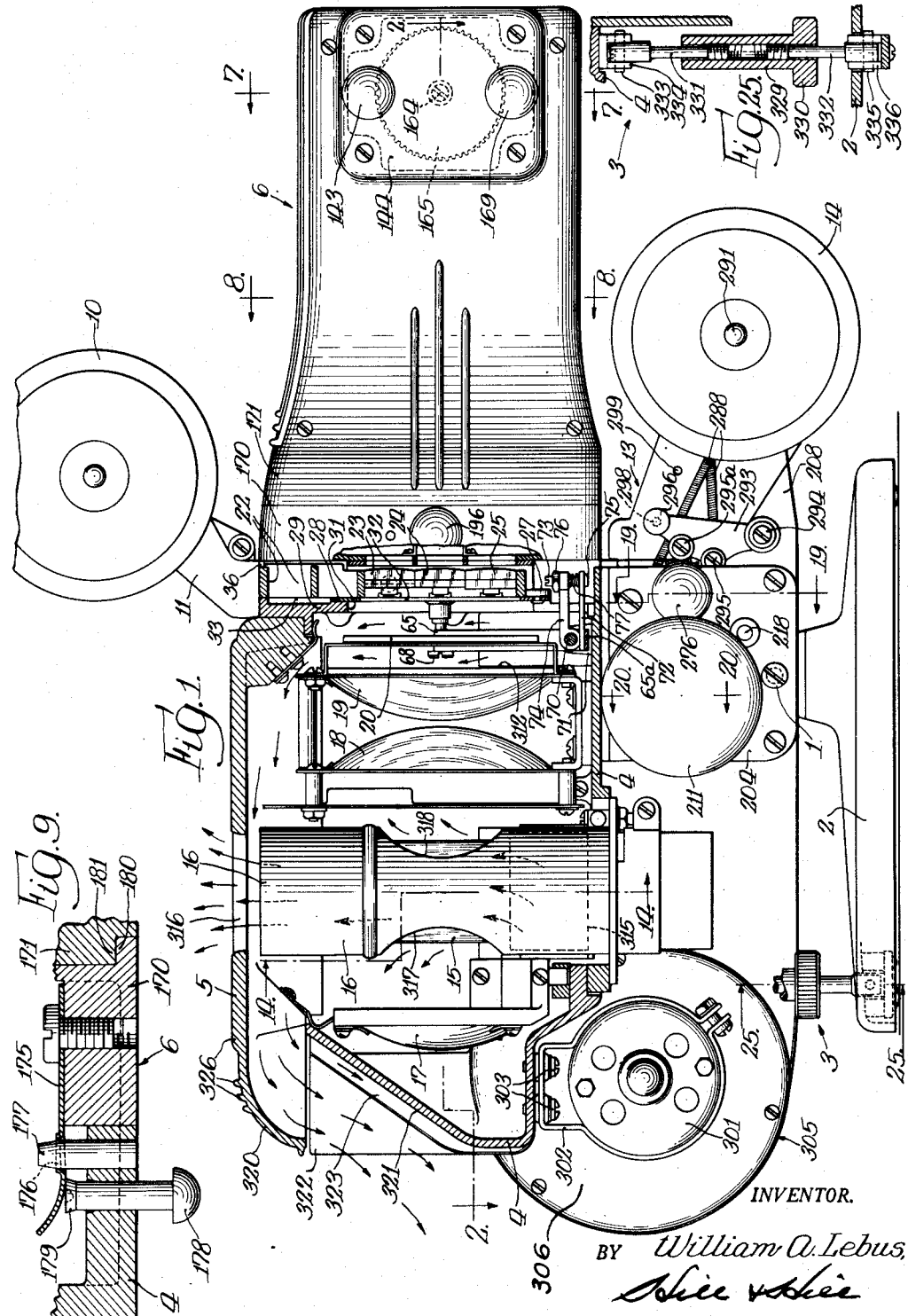
INVENTOR.
BY William A. Lebus,
Attys.

Sept. 4, 1945.　　　W. A. LEBUS　　　2,384,319
PROJECTOR
Filed Nov. 9, 1942　　　8 Sheets-Sheet 2
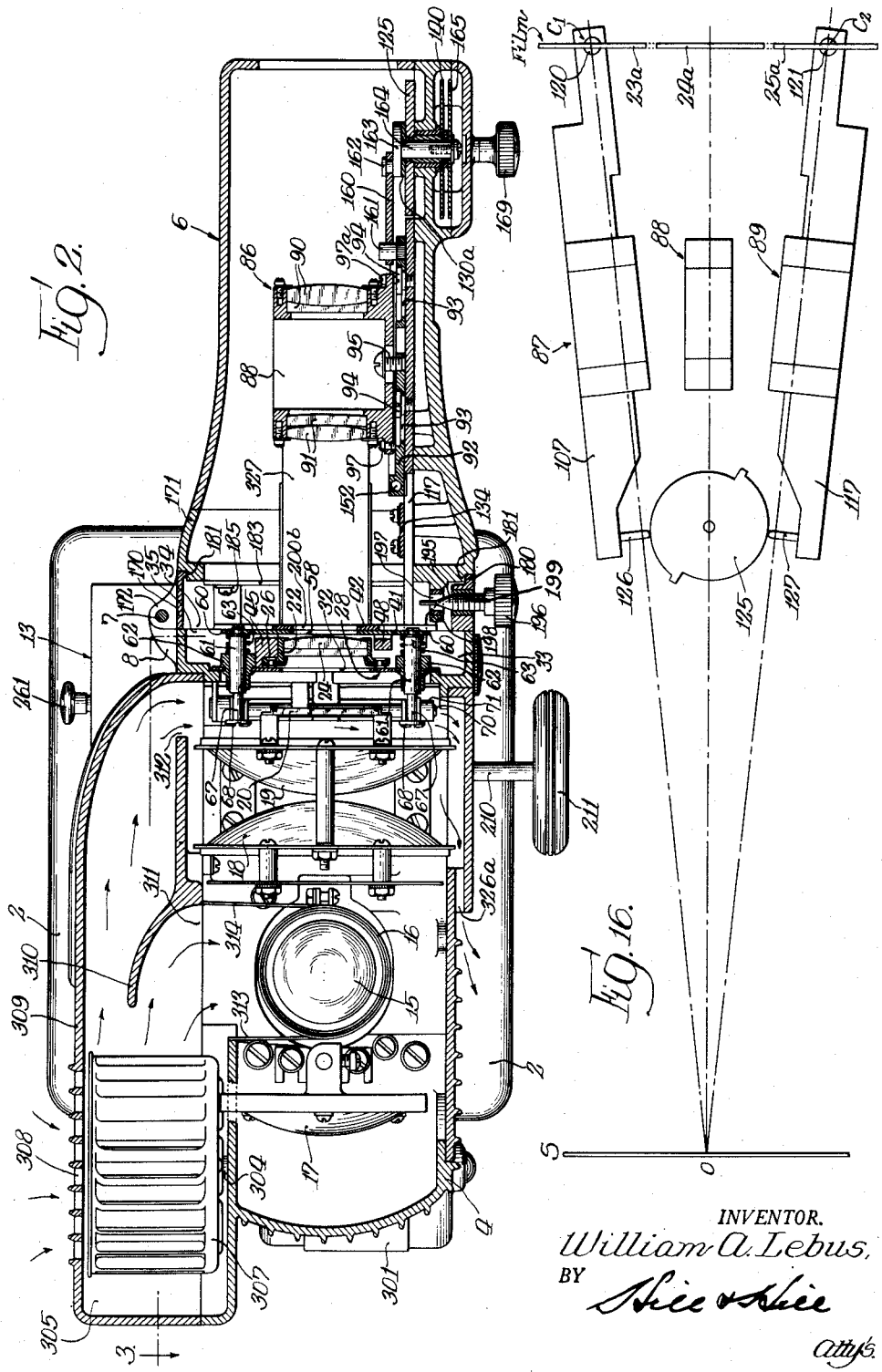
INVENTOR.
William A. Lebus,
BY
Attys.

Sept. 4, 1945.  W. A. LEBUS  2,384,319
PROJECTOR
Filed Nov. 9, 1942  8 Sheets-Sheet 3
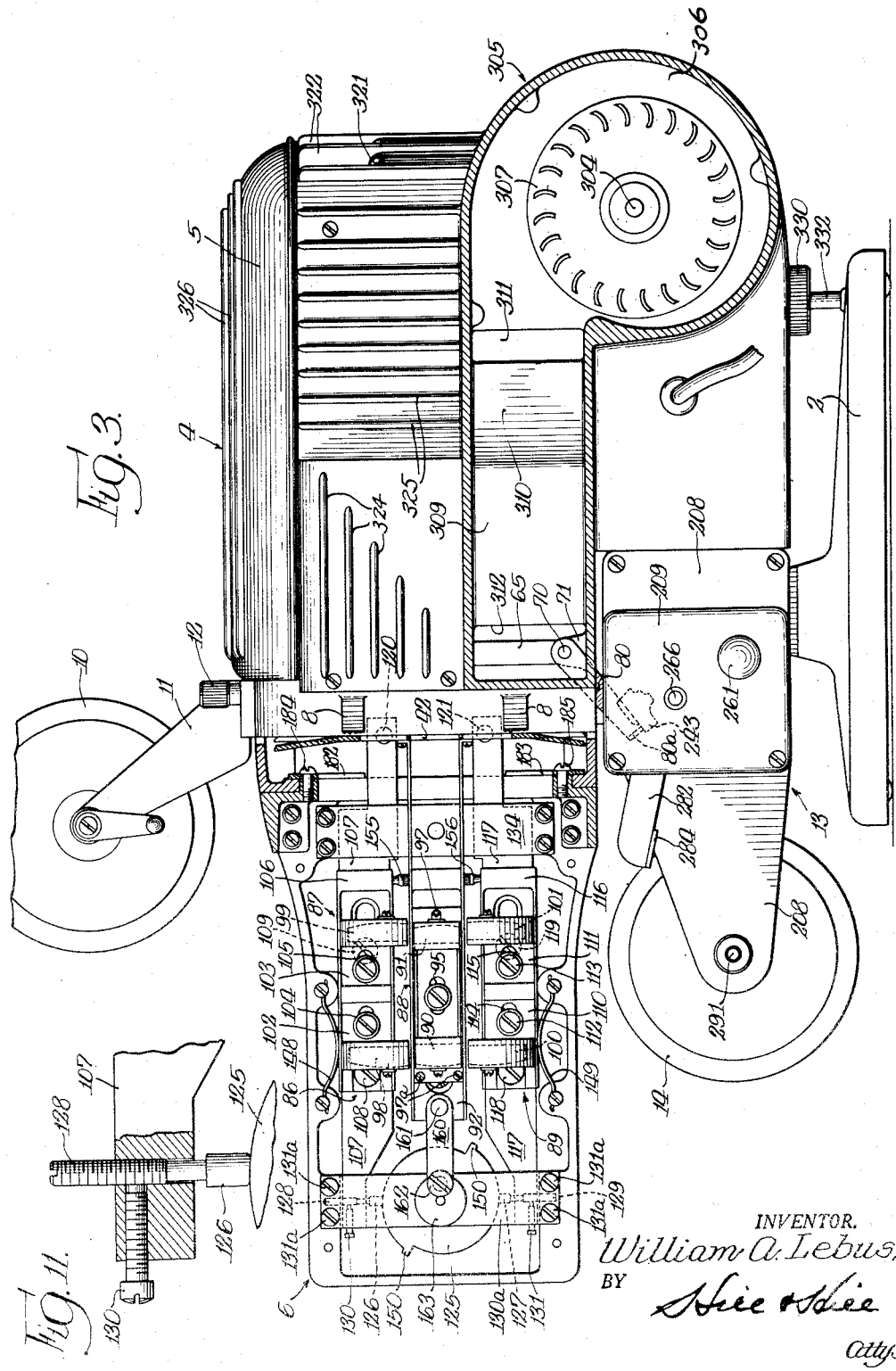
INVENTOR.
William A. Lebus,
BY
Hill & Hill
Atty's.

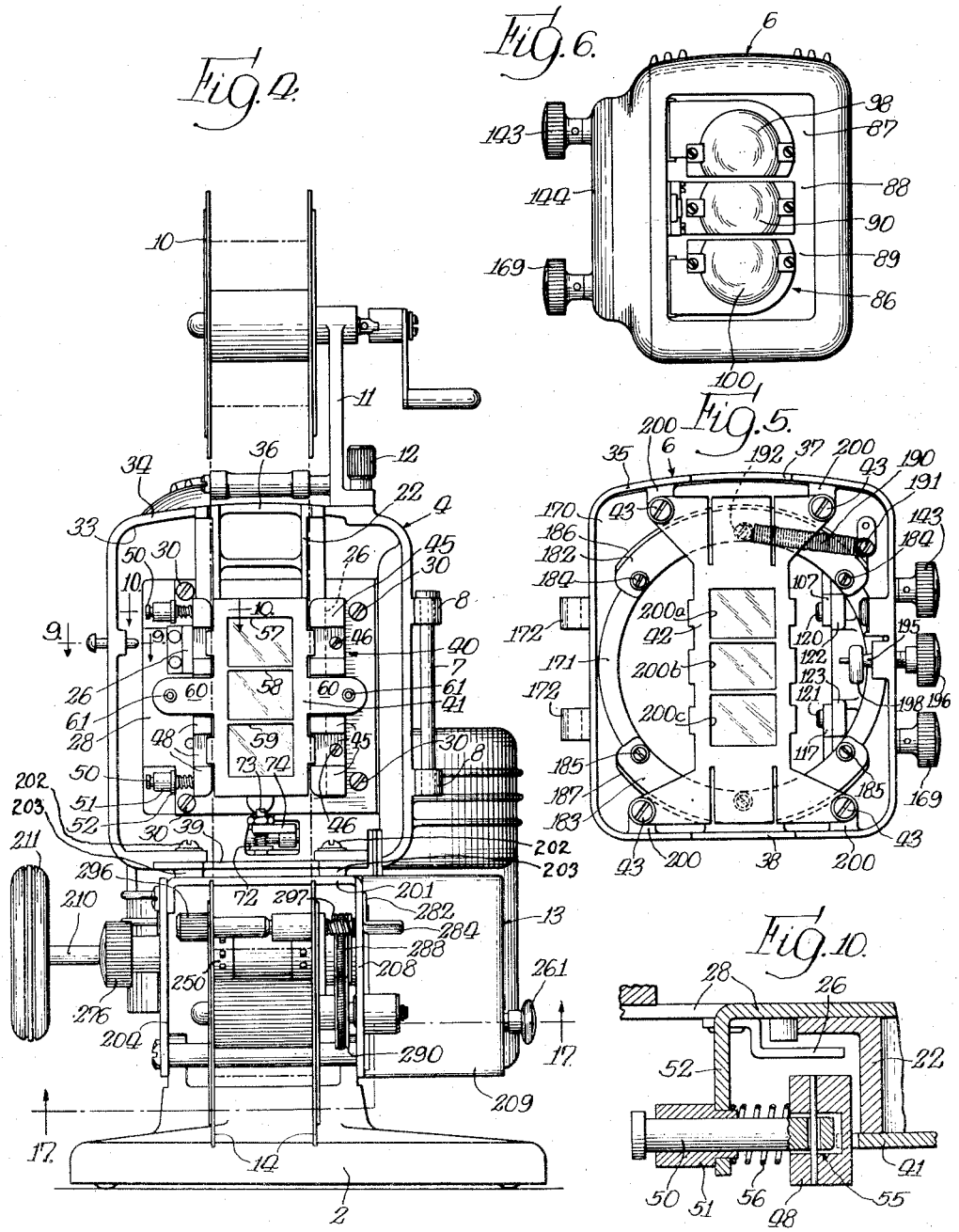

Sept. 4, 1945. W. A. LEBUS 2,384,319
PROJECTOR
Filed Nov. 9, 1942 8 Sheets-Sheet 5
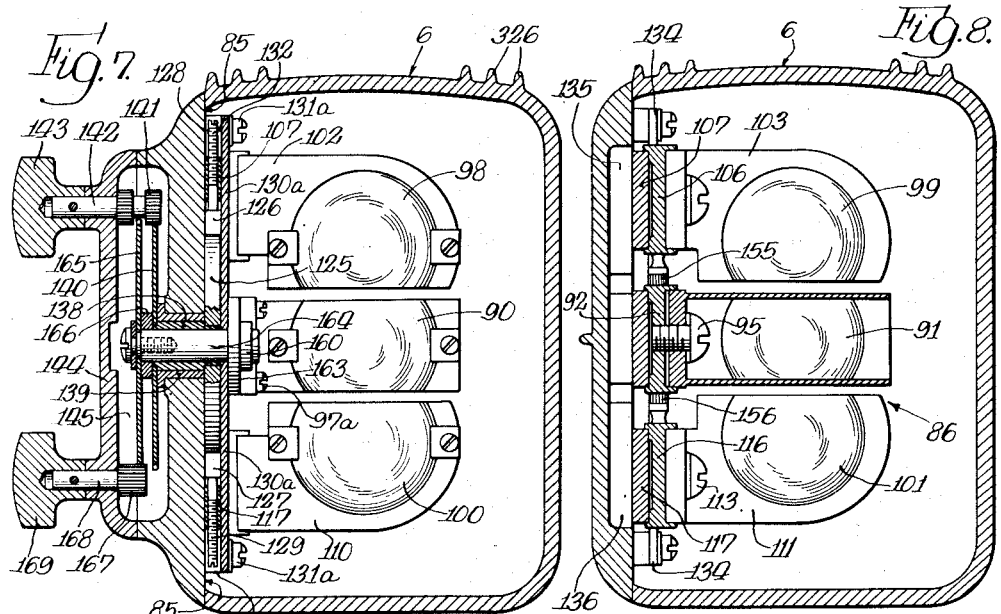
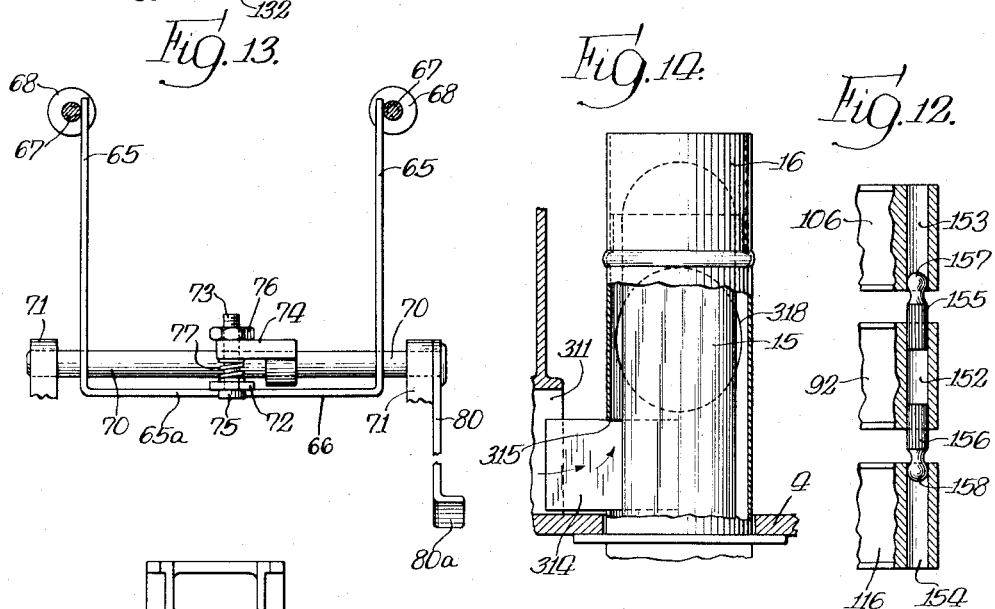
INVENTOR.
William A. Lebus
BY
Attys.

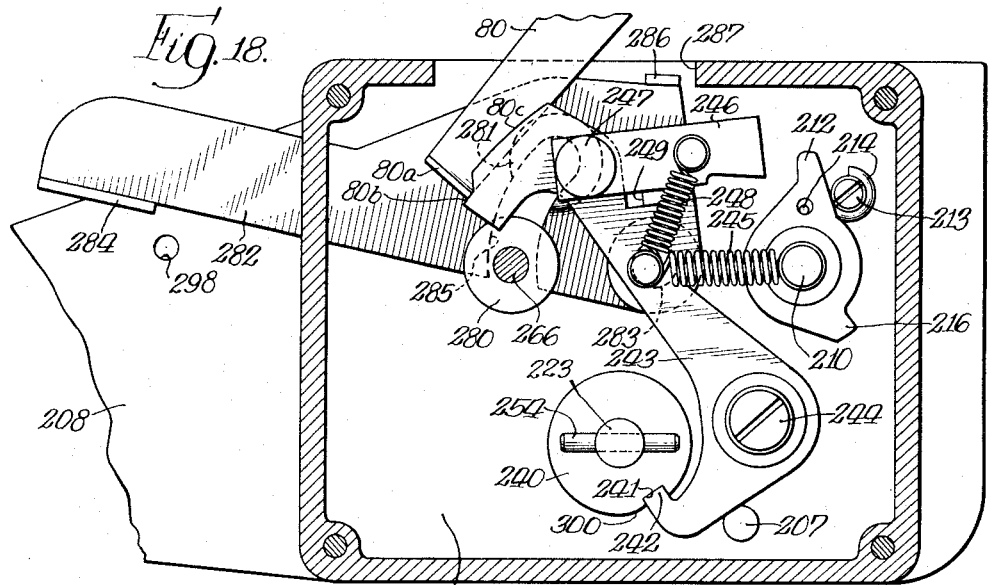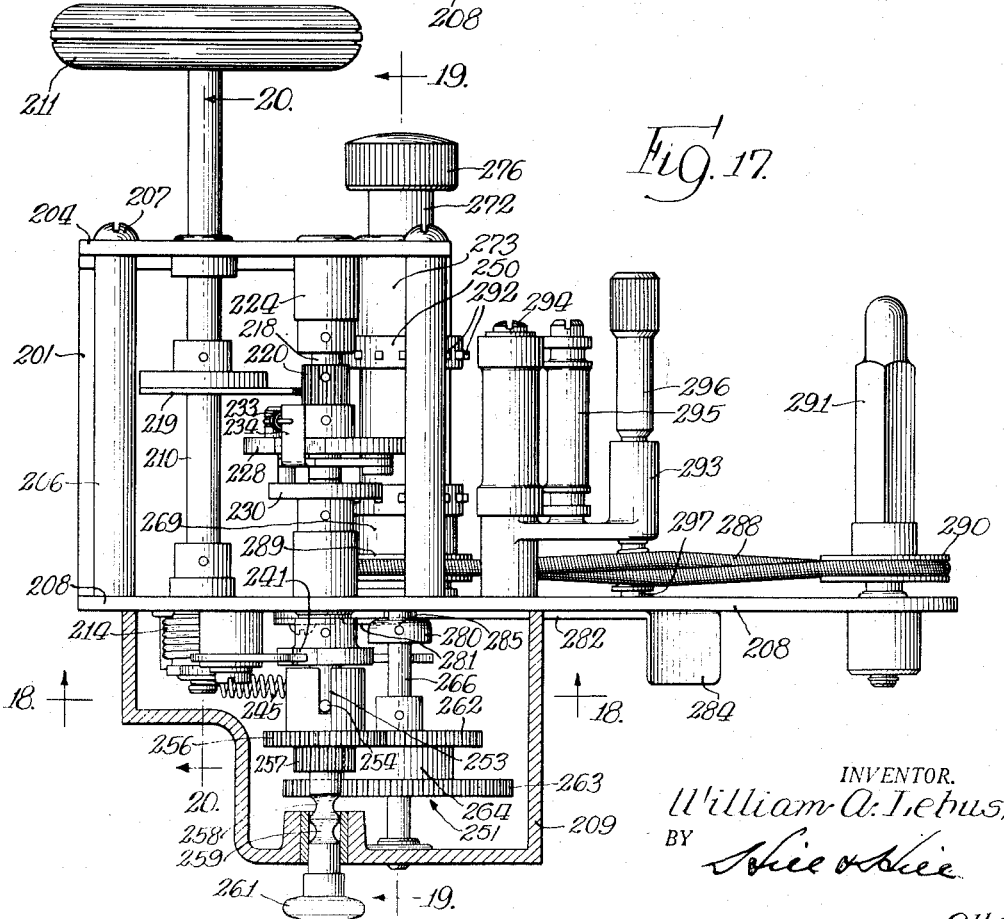

Sept. 4, 1945.  W. A. LEBUS  2,384,319
PROJECTOR
Filed Nov. 9, 1942  8 Sheets-Sheet 7
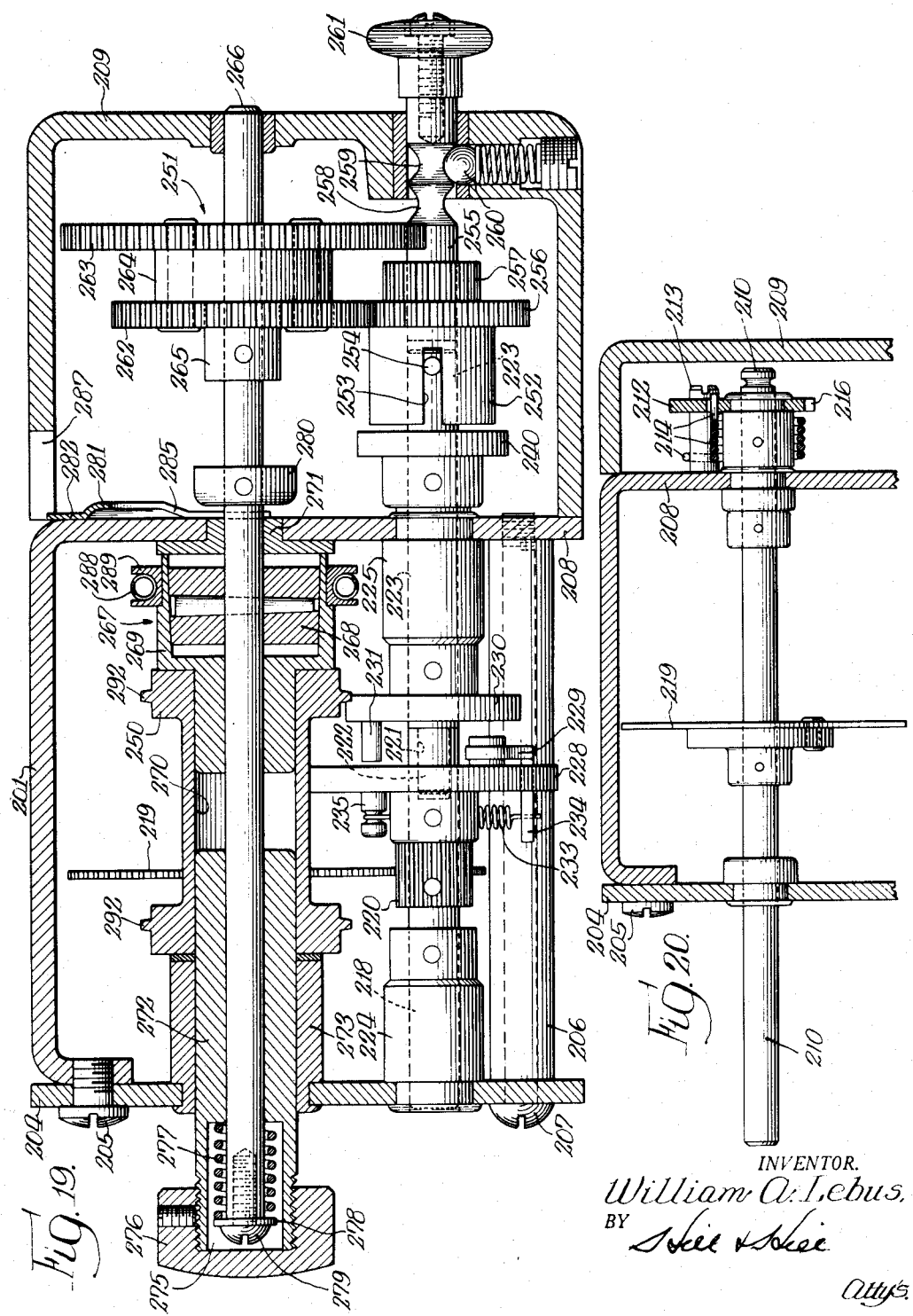
INVENTOR.
William A. Lebus,
BY
Atty's Sept. 4, 1945.   W. A. LEBUS   2,384,319
PROJECTOR
Filed Nov. 9, 1942   8 Sheets—Sheet 8

INVENTOR.
William A. Lebus,
BY
Attys.

Patented Sept. 4, 1945

2,384,319

UNITED STATES PATENT OFFICE 2,384,319

PROJECTOR

William A. Lebus, Chicago, Ill., assignor to Prismacolor, Inc., Chicago, Ill., a corporation of Illinois Application November 9, 1942, Serial No. 464,961

9 Claims. (Cl. 88—24)

The present invention is directed to a new form, construction, arrangement and combination of parts all embodied in a projector adapted for multiple color picture projection. This projector is of the type wherein individual images or colored cut-outs of the same photographed object are provided by a film or a plate and are projected upon a screen by an assembly of juxtaposed lenses or lens groups, and wherein the respective groups of lenses are positioned in the paths of light that are passed through the respective color filters and wherein the images are brought into focus upon a common plane comprising a picture screen so as to present a composite colored picture by the superimposed relation of the different colored images. In the device of the present invention, the photographed objects are provided on a film in triplicate and in black and white by any suitable camera for this purpose, and the film is fed vertically through the machine. The same machine could be constructed to feed the film horizontally if that should be desired depending upon the type of film and the nature of the camera producing this film.

Obviously, by intermittently advancing each triplicate set of filmed pictures of each particular photographed object and by passing the rays of light from the lamp housing through the three color filters which are herein employed, it is very important to bring the three pictures in exact focus and in registered relation upon the projection screen in order to obtain the best optical reproduction possible without aberration or other optical distortions, and in order to obtain the most accurate image with the greatest degree of sharpness throughout the entire area of the reproduced picture.

In order to obtain the ultimate picture reproduction desired, the present projector has as one of its main objects a new and novel mechanism for mounting the different lens groups to obtain the best possible optical reproduction by so mounting the lenses in relation to each other so as to have the projected light from each of the multiple pictures pass through its respective lens system symmetrically about the optical center line or axis of such lens group for the purpose of obtaining the most efficient composite picture of the plurality of colored images. In the present device, the central lens group is mounted to lie upon the projection center of the machine, which theoretically passes through the exact center of the center film picture of the triplicate group and the two juxtaposed lens groups adjacent the center group of lenses are so mounted as to move about pivots coincident with their respective picture planes of the triplicate group on the film and adjacent the exact center points of said respective pictures. By moving the outer lens groups relative to the center lens group, the exact vertical registry of the three colored images from the colored cut-outs may be obtained.

Also, in connection with obtaining registry of the three superimposed pictures horizontally with respect to the screen, the lens groups are so mounted as to rotate bodily about the optical or projection center of the machine and its reproduced picture on the screen.

A further object of the present invention is to also provide new and novel means for moving the lens sets bodily as a group toward and away from the plane of the film for the purpose of varying the distance of the common focal plane of the lens sets to bring said focal plane into coincidence with the projection screen.

Another advantage inherent in the construction of the present projector and which definitely makes possible the accuracy with which the foregoing various mountings of the lenses may be brought into the refined adjustments mentioned is the provision of a single machined surface adapted for the sole purpose of receiving and mounting all of said mechanisms which focus the lenses and which produce the adjustments for registering the superimposed colored images both horizontally and vertically.

Another feature of importance in the mounting of the lens groups of the present projector is to provide each pair of vertically juxtaposed lenses with independent mountings so that the lenses of each juxtaposed group may be adjusted relative to each other individually or also individually relative to the center group of lenses. The lenses of the center lens group may also be mounted independently of each other.

A further object of this invention is the arrangement and combination of parts which provide a pivotally supported lens housing which carries all of the aforesaid mechanisms for the precision projection on the screen of the colored images, such pivotal housing providing means for access to the mechanism which provides the film track and film threading mechanism. Since it is important to maintain the plane of the film in a definite relation with respect to the distance from the lens groups hereinbefore referred to, the pivotal lens housing is provided with a stationary or fixed film backing plate against which the film is normally urged during projection by mechanism contained in the stationary housing of the projector. By the provision of such a backing plate or film guiding means, the focal plane of the film is, therefore, maintained in fixed relation with respect to the lenses and lens group mountings and all variations in maintaining the path of the film in this fixed relation are taken up and corrected by the mechanism enclosed within the stationary housing.

Another important feature embodied in the projector of this invention is the provision of new and novel film transport mechanism which is utilized for advancing the film into proper relation with respect to the lens system of the projector. This film transport mechanism is adapted for advancing each group of three pictures bodily and may also be utilized for advancing individual frames of pictures should that be desired. When the projector is used for reproducing individual pictures from films containing such pictures, the projector is then adapted for black and white reproduction, and in that case the frame carrying the color filters may be replaced by a suitable masking frame which contains only one aperture to admit light from the lens housing through the center group of lenses and on to the screen.

The film transport mechanism incorporates a number of features such as the provision of a clutch which when released will allow the film to be hand fed in either direction and the feature of providing suitable connecting means for releasing all pressure of the film guiding mechanism immediately prior to moving the film by the transport means. Also, the film transport mechanism is hand operated by means of a hand knob so connected as to feed the film when turned in one direction and which is capable of resetting itself in the reverse direction to allow the next hand feed to be a repetition of each successive picture advancing operation. Only a partial turn of the hand knob is required to feed the film.

Another important and advantageous feature embodied in the present invention is the cooling system employed therein for holding the heat transmitted to the film from the lamp to a minimum thereby maintaining film expansion at a minimum for the purpose of better controlled reproduction. The cooling system is divided into several paths, so that the air from the motor driven blower may traverse the space adjacent the film and pass out through the housing and also along the cover from near the film space rearwardly and to be directed downwardly and outwardly through cooling fins at the rear end of the projector, the other path of air being directed into the lamp chimney for cooling the lamp and most of the air from the lamp chimney is immediately expelled through an appropriate opening in the top of the cover to prevent any additional heating of any of the housing structure.

All further improvements and refinements in the various mechanisms embodied in the projector of the present invention shall hereinafter be referred to in a more detailed description of the working parts thereof and as relating to the accompanying drawings illustrating a preferred embodiment of the projector of the present invention.

In the drawings:

Fig. 1 is a side elevational view of the projector embodying the new and novel features of my invention, partially broken away and in section, to indicate the interior of the lamp housing, the film aligning means, and other associated mechanisms.

Fig. 2 is a horizontal cross-sectional view taken longitudinally of the projector and along the projectional axis thereof substantially as indicated along the line 2—2 in Fig. 1.

Fig. 3 is another side elevational view of the projector of my invention as viewed from the reverse side of that shown in Fig. 1 and also partially in section as indicated approximately by the line 3—3 in Fig. 2 with a near portion of the lamp housing being omitted to clearly disclose the cooperative mechanisms that mount the lenses in the housing, and which adjust the same for picture projection.

Fig. 4 is a front elevational view of the projector with the pivotal lens housing removed to better illustrate the film guiding and control mechanisms.

Fig. 5 is an end elevational view of the lens housing as viewed from the film end thereof which is analogous to the hinged end that is normally disposed in abutting relationship with respect to the adjacent end of the fixed lamp housing portion best illustrated in Fig. 4.

Fig. 6 is an end view from the reverse end of the lens housing illustrated in Fig. 5 which would normally be from the extreme front end of the complete projector.

Fig. 7 is a cross-sectional view taken transversely to the projectional axis of the machine and substantially as viewed along the line 7—7 in Fig. 1.

Fig. 8 is another cross-sectional view transversely of the lens housing as Fig. 7, but as viewed substantially along the line 8—8 in Fig. 1.

Fig. 9 is a fragmentary illustration of the latching means utilized for holding the pivotal lens housing in closed and abutting relationship with respect to the lamp housing, said figure being taken substantially on the plane of the line 9—9 in Fig. 4 and through the combined housings.

Fig. 10 is another fragmentary illustration of a portion of the film guiding mechanism and as viewed substantially along the line 10—10 in Fig. 4.

Fig. 11 is an enlarged view of the follower mechanism associated with the forward end of one of the arms carrying one of the lens groups, said arm being partially broken away and in section to illustrate the adjustable features of the follower.

Fig. 12 is an enlarged view of the connecting mechanism utilized between the mountings of the three lens groups partially in section, which mechanism functions to bodily move the lens groups forwardly and rearwardly of the projector for focusing the lenses while also permitting the registry movement of the lens groups.

Fig. 13 is a detailed view illustrating the mechanism utilized for actuating the pressure plate away from the film backing plate to relieve pressure on the film while the latter is being advanced in changing pictures.

Fig. 14 is another detailed illustration partially in section of the lamp and lamp chimney as viewed substantially along the line 14—14 in Fig. 1.

Fig. 15 is a face view of the masking frame with the single aperture which may be utilized to replace the frame carrying the color filters whenever the projector is being used in single frame picture projection for black and white films.

Fig. 16 is a diagrammatical illustration of the manner in which the outer lens groups are moved relative to the center lens group for the purpose of obtaining vertical registry of the images when the latter are being projected upon a screen.

Fig. 17 is a bottom elevational view of the film transport mechanism and its associated parts with a portion of the housing in section and viewed substantially as indicated along the line 17—17 in Fig. 4.

Fig. 18 is a cross-sectional view as taken substantially along the line 18—18 in Fig. 17, illustrating certain of the film transport mechanism parts, said figure being inverted with respect to Fig. 17 and shown in its normal relation to the projector.

Fig. 19 is a transverse cross-sectional view taken through the film transport mechanism and as viewed substantially along the lines 19—19 in Figs. 1 and 17.

Fig. 20 is a fragmentary sectional view as taken along the lines 20—20 in Figs. 1 and 17, respectively.

Figure 21:
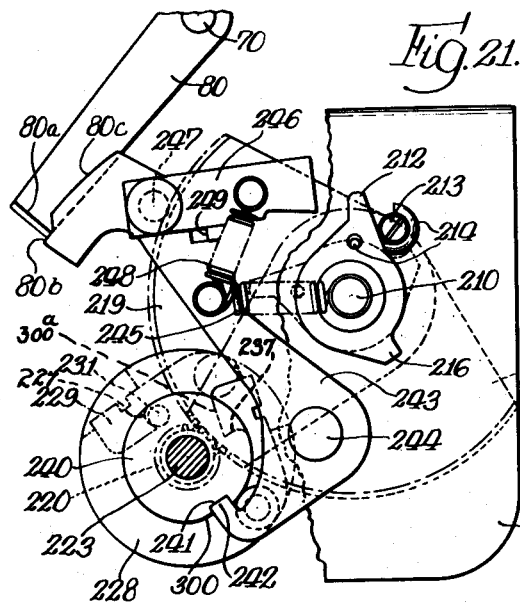

Figs. 21 to 24 inclusive are fragmentary illustrations of certain of the working parts of the film transport mechanism showing the same in various operative relationships to illustrate certain steps in the operation of said film transport mechanism; and Fig. 25 is a sectional view taken axially of the projector leveling mechanism and along the plane of the line 25—25 indicated in Fig. 1.

Referring to the drawings, the projector is pivotally supported at 1 upon a base 2 and may be suitably tilted as by the levelling screw mechanism 3 in a known manner. The projector housing is primarily divided into a main casing or lamp housing 4 having a removable cover 5 for access to the lamp housing, and a lens housing 6 which is pivotally supported upon the vertically disposed pin 7 carried by the lugs 8 of the main housing 4. The film may be fed through the projector housing in any desirable manner and in the present construction the film supply reel 10 is pivotally mounted on the brackekt 11 secured to the main housing 4 by a knurled screw 12 and the film is passed through the projector housing substantially along the line of the opposing surfaces of the fixedly supported main housing 4 and the pivotal lens housing 6 and passes through suitable mechanism comprising the film transport unit 13 which is adapted for moving the film through the projector and for driving the film rewind reel 14.

Referring more particularly to Fig. 1 it is to be noted that the main lamp housing 4 contains the necessary light projecting system which may be generally described as follows: The light source comprises the lamp 15 enclosed in the suitable lamp chimney 16, a reflector 17 disposed rearwardly with respect to the lamp with a pair of condensing lenses 18 and 19 disposed forwardly of the lamp and in the path of the reflected light with an additional heat absorbing glass shielding member 20 completing the system for providing the necessary light for the purpose of projection.

A color filter unit comprising a removable frame 22 carrying the colored lenses 23, 24 and 25 is suitably nested in appropriate guideways such as 26 in Figs. 2 and 4 in the forward end of the main housing. The bottom end of the frame 22 rests upon the stop lug 27 secured to the plate 28 and the latter is fastened to the wall 29 by means of appropriate screws such as 30, see Fig. 4. It should be noted that the wall 29 is provided with an aperture 31 which is substantialy covered by the plate 28, and the latter is provided with an aperture 32 just large enough to permit the passage of light from the lamp housing through the color filters 23, 24 and 25. Therefore, wall 29 and the plate 28 substantially form a division for separating the units in the lamp housing 4 from the filter units and film feed mechanism disposed in the chamber 33. Also, chamber 33 opens outwardly for communication with the interior of the pivotal lens housing 6.

Referring more particularly to Figs. 1 and 4, it is to be noted that the film passes downwardly substantially in line with the meeting edges of the pivotal lens housing 6 and the forward face of the main housing 4 which are designated as 34 and 35, respectively. In order that the film may enter the projector along the aforementioned juncture line, the upper portion of the filter frame is cut away as at 36 and the upper meeting edge of the pivotal lamp housing is also recessed as at 37. Also, in order that the film may pass out of the projector, the bottom meeting edge of the lens housing 6 is recessed as at 38 for cooperation with a complementary recess 39 formed in the bottom face edge of the main housing 4. The film guiding and aligning mechanism is generally indicated by the reference numeral 40 and this mechanism is housed in the chamber 33 hereinbefore referred to at the forward open end of the main housing 4 of the projector.

*Film guiding and aligning mechanism*

Referring now more particularly to Figs. 2 and 4, the film guiding and aligning mechanism comprises a resiliently supported pressure plate 41 which is adapted to normally urge the film tightly against the stationary plate 42 when the lens housing is in closed position. The latter is mounted to be fixedly carried by the pivotal lens housing 6 by means of suitable screws 43 and swings bodily therewith when the housing is opened or closed. The resilient pressure plate 41 is suitably disposed between the fixed laterally disposed guide member 45 secured to the plate 28 by means of suitable screws 46. This lateral film guide 45 provides a stationary member for constantly receiving and aligning one edge of the film as the latter passes through the projector. Oppositely disposed with respect to the fixed guide 45 is a movably mounted guide 48 that is adapted to engage the other edge of the film and by resilient means will hold the film laterally against the fixed guide 45. As best shown in Fig. 10, the movable guide is mounted by means of pins 50 slidably supported in bearings 51 carried by the lugs 52 which extend forwardly from the plate 28. The ends of the pins 50 are connected to the movable aligning guide 48 by suitable mechanism such as illustrated in Fig. 10 by the reference numeral 55 to allow for limited pivotal and swinging movement of the guide 48 about a vertical axis to further aid in guiding and maintaining the film in aligned relation with respect to the projectional axis of the machine. Springs 56 encircle the pins 50 and react against the ears 52 to normally urge the guide 48 against the edge of the film.

The pressure plate 41 is disposed between the fixed guide 45 and the movable guide 48 with sufficient clearance to allow fore and aft movement thereof and it is to be noted as best shown in Fig. 4 that the pressure plate is provided with three apertures 57, 58 and 59 which are adapted to definitely outline each particular frame of the triplicate set of pictures of the same photographed object. The pressure plate 41 is also provided with lateral arms 60 which are adapted to fixedly receive the studs 61 slidably supported in the bearing sleeve members 62 also secured to the plate 28. Suitable springs 63 encircle the studs 61 and are confined between the fixed bearing sleeve 62 and the pressure plate 41 to maintain the latter forwardly and in engagement with the rear side of the film to hold the latter against the fixed backing plate 42 carried in the pivotal lens housing 6.

In order to permit the free movement of the film during the transposition of the pictures which are being projected, the pressure plate 41 is bodily moved rearwardly by means of the vertically disposed ends 65 of the U-shaped bracket 66. The ends 65 of the bracket lie adjacent the reduced ends 67 of the studs 61 and are adapted for engaging the screws 68 which are threaded into the reduced ends 67 of the studs 61. The bracket 66 is pivotally supported to be rocked about a shaft 70 pivotally supported by means of lugs 71 carried by the main housing 4. The central portion 65a of the U-shaped bracket 66 lies beneath the shaft 70 and is provided with a projecting arm 72. Arm 72 is connected by means of an adjustable pin 73 to the arm 74 which is fixed to the shaft 70 to rotate directly with the latter. Obviously, any motion imparted to the arm 74 by means of the shaft 70 will act to lift the arm 72 by means of the head 75 of the pin engaging the under side of the arm 72 and by means of the adjustable nut 76 bearing against the upper side of the arm 74. Also, the spring 77 is interposed to maintain the proper spaced relation between arms 72 and 74 so that suitable adjustment for moving the pressure plate 41 rearwardly by means of the ends 65 of the U-shaped bracket 66 may be conveniently accomplished.

Synchronized motion is imparted to the shaft 70 by means of an arm 80 connected with and secured to shaft 70, the arm 80 being actuated through the operation of the film transport mechanism in a manner which will hereinafter be fully explained. The foregoing mechanism provides the means and mechanism whereby the film is always maintained in a fixed focal plane with respect to the lens groups mounted in the pivotal lens housing 6 and the latter when released and opened also provides the means for properly threading the film through the projector and through the guiding and aligning mechanism as described above.

*Lens mounting mechanism of the lens housing*

Referring now more particularly to Figs. 2, 3, 7 and 8, it is to be noted that the pivotal lens housing 6 is provided with a single machined surface 85 disposed adjacent one lateral side thereof for the purpose of mounting the lens supporting mechanisms 86 that are employed for obtaining the necessary focus of the multiple color images and for obtaining the necessary vertical and horizontal registry of the superimposed pictures as projected. Since the present projector is specifically adapted for reproducing pictures with the primary three colors red, blue, and green, it is obvious that three lens groups such as 87, 88 and 89 must be employed for projecting the pictures. The central group of lenses comprising the lenses 90 and 91 are mounted in fixed relation upon a slide 92 and the latter is provided with appropriate slots 93 which are engaged by the heads of the screws 94 for the purpose of slidably supporting the center lens group 88 for fore and aft movement along the projectional axis of the projector. The lens group 88 is adjustably connected to the slide 92 by means of the screw and slot connection 95, and also, the lens group 88 may be shop adjusted by means of the screw 97 for fore and aft inclination in one vertical plane and the lateral spaced screws 97a are used for inclination of the group 88 with respect to a vertical plane at right angles to said first vertical plane.

The vertically juxtaposed lens groups 87 and 89 are divided into the pairs of lenses 98, 99, and 100, 101, respectively. Each of the pairs of lenses of each group 87 and 89 are individually mounted in brackets 102 and 103, and the latter are adjustable by means of the screw and slot connections 104 and 105, respectively, the screws entering the slide 106 which supports both of the lenses 98 and 99 as a bodily movable group when the latter has been adjusted. By individually mounting the lenses 98 and 99, it is possible to utilize less costly lenses and to obtain the proper adjustment of the lens groups by means of moving such lenses as 98 and 99 individually with respect to each other and individually with respect to the center lens group 88 comprising the lenses 90 and 91. If desired, the lenses 90 and 91 of the center group 88 may also be made separably adjustable.

A slide 106 is mounted for longitudinal movement relative to an arm 107 by means of the screws 108 and the slots 109 similarly to the slidable mounting of the center lens group. The lens group 89, comprising the lenses 100 and 101, respectively, is also arranged so as to have the brackets 110 and 111 individually support the lenses 100 and 101 respectively. Screws 112 and 113 are utilized for adjusting the brackets by means of the slots 114 and 115 formed in the brackets and the screws 112 and 113 fasten into a slide 116 which is adapted for bodily moving the lens group 89 fore and aft of the projector similarly to the other lens groups. A slide 116 is movably carried on the arm 117 by means of the screws 118 and 119 in said arm which engage in suitable slots in the slide 116 similar to those described in connection with the center lens group.

As hereinbefore referred to, the center lens group 88 is mounted for sliding movement along the axial center of projection, while the vertically juxtaposed lens groups 87 and 89 have now been described as mounted for sliding movement upon the arms 107 and 117. It should be noted that arms 107 and 117 are pivotally carried on the pins 120 and 121 which are supported by means of lugs 122 and 123 forming rearwardly extending integral parts of the pivotal lens housing 6. Furthermore, the axes of the pivot pin 120 and 121 are disposed in the plane of the film path and are also vertically spaced so as to be located on the horizontal axial centers of the vertically disposed film picture frames forming the outer two pictures of the triplicate set of the same photographed object. Therefore, any movement imparted to the arms 107 and 117 shall move the lens groups 87 and 89 about pivotal centers which are disposed in the focal plane of the film and which are so spaced as to pivot about the mid points of the vertically juxtaposed film frames of each triplicate group of pictures of each photographed object.

The means for actuating the arms 107 and 117 comprises a symmetrical cam 125 pivotally supported intermediate the forward ends of the pivot arms 107 and 117. Each of the foregoing arms is provided with an adjustable follower such as at 126 and 127, respectively, which are vertically adjustable by means of the screws 128 and 129 located in the forward ends of the arms 107 and 117, respectively, as best illustrated in Fig. 11. Suitable locking screws such as 130 and 131 are adapted for fixing the position of the followers 126 and 127 as determined by their respective adjusting screws 128 and 129, respectively. Obviously, any movement of the cam 125 about its axial center will operate to move the followers 126 and 127 with the same increment of movement due to the symmetry of the cam 125 whenever the latter is rotated.

Referring now more particularly to Figs. 2, 3 and 7, the dual cam 125 is confined between the surface 85 of the lens housing and the vertical retaining strap 130a that is secured to the surface 85 by means of the screws 131a which pass through suitable spacers 132 for the purpose of supporting the strap 130a with the necessary clearance for the dual cam 125 and also to make the strap 130a function as a guide means for the forward ends of the arms 107 and 117. A similar strap as 130a is shown at 134 secured to the same wall surface 85 but to the rear portion of the lens housing 6. The arms 107 and 117 are snugly confined between the straps described and the bosses such as 135 and 136 as in Fig. 8 and the bosses are integral with the lens housing 6 and are also machined flush with the wall surface 85 to properly guide the arms 107 and 117 with their respective lens groups 87 and 89 in true vertical motion.

Referring back to the dual cam 125 and as best shown in Figs. 2 and 7, the cam is secured to a sleeve 138 which is journaled in the bushing 139 carried by the same side wall of the lens housing 6 that has the machine surface 85. Sleeve 138 has a relatively large gear 140 secured to the end opposite from the dual cam 125 and gear 140 meshes with a smal pinion 141 mounted for rotation with the shaft 142 and the latter may be rotated by the hand knob 143 which is fixed thereto. The shaft 142 is suitably mounted for rotation in the auxiliary cover member 144 secured to and cooperating with the lens housing 6 to form the chamber 145 which houses the gear mechanism for adjusting the lenses.

To complete the action of the arms 107 and 117 in adjusting the angularity of the vertically juxtaposed lens groups by means of the followers 126 and 127 coacting radially with the dual cam 125, suitably mounted leaf springs 148 and 149 are carried by studs secured to the lens housing and the central portions of these springs bear upon the slide members 106 and 116, respectively, to maintain the followers 126 and 127 in active contact with the dual surfaces of the cam 125. Therefore, as best viewed in Fig. 7, by operating the hand knob 143 and by means of the reduction between the pinion 141 and gear 140, a substantial vernier reduction is obtained for rotating the cam 125 through the sleeve 138 to either spread or move the arms 107 and 117 together about their respective pivots and relative to the other lens group for obtaining vertical registry of the multiple images projected upon the screen by the projector lens system. By rotating the cam 125 in a clockwise direction about its axis as viewed in Fig. 3, the arms 107 and 117 are spread apart and by reversing the rotation of the cam in the counterclockwise direction, the arms 107 and 117 will be brought toward each other by means of the leaf springs 148 and 149. The full rotation of the cam 125 is slightly under 180 degrees and as shown the cam is provided with lugs 150 diametrically disposed for the purpose of abutting the followers 126 and 127 at the limits of the movement of the cam 125 in either direction of its rotation.

With the adjustment described for obtaining the vertical registry of the color images projected upon the screen, it is to be noted that the light which passes through all three of the film frames from the light source and color filters will then also pass through the optical axes perpendicular to the vertical planes of the lenses which gives the best optical projection possible without aberration, etc., and which reproduces the most accurate image with the greatest degree of sharpness. All of which is primarily obtained by the manner in which the vertically juxtaposed lens groups are pivotally supported in the predetermined relation hereinbefore clearly explained.

*Focusing adjustment of the lens groups*

In focusing the projector, the three lens groups 87, 88 and 89 must be moved bodily in the longitudinal direction of the projectional axis of the device in order to vary the distance between the focal plane of the picture film and the lenses in the aforesaid groups. The manner in which the three lens groups are connected together for bodily movement without interfering with the adjustment of the outer lens groups with respect to the center lens group is accomplished by providing slides 92, 106 and 116 with the vertically aligned bores 152, 153 and 154, respectively, and by drive fitting the studs 155 and 156 into the bore 152 of the slide 92 that carries the center lens group 88. The studs 155 and 156 are provided with rounded heads 157 and 158, respectively, which snugly fit within the bores 153 and 154 of the outer lens groups 87 and 88, respectively. Obviously, these connections may be reversed, if desired, with the studs 155 and 156 carried by the outer slide members. With the foregoing floating connection between the three slides of the lens groups, it is possible to move the center slide 92 and to transmit this motion bodily to the vertically juxtaposed lens groups 87 and 88, and at the same time after the proper movement of the lens groups has been obtained for focusing the instrument, it is also possible to operate the vertical registry adjustment by means of turning the knob 143 and the outer lens groups will readily move toward or away from the center lens group without interference due to the novel floating connection described.

Longitudinal motion is transmitted to the slides by means of the connecting link 160 pivoted at 161 to the forward end of the slide 92 and pivotally connected in off center relation at 162 to the disc 163. As best shown in Figs. 2 and 7, the disc 163 is secured to the shaft 164 and the latter is journaled within the sleeve 138 previously described. A gear 165 is secured to the outer end of the shaft 164 and a spacer in the form of a bushing 166 is carried on the shaft 164 between the two gear wheels 140 and 165 for properly positioning the same. Gear 165 meshes with a pinion 167 forming part of the shaft 168 journaled in the auxiliary cover 144 and a hand knob 169 is secured to the outer end of the shaft externally of the housing 144 for the purpose of rotating the pinion 167. Obviously, any rotation of the knob 169 will furnish a control by means of the gear reduction and the drive through the shaft 164 to rotate disc 163 to move the link 160 in a fore and aft direction with respect to the lens housing and to bodily move all of the lens groups fore and aft of the lens housing to secure proper focus of the picture upon the screen.

Mechanism for obtaining horizontal registry of the picture images

To obtain horizontal registry of the superimposed images projected by the machine, the lens groups 87, 88 and 89, and the entire housing 6 within which the latter are mounted and supported with their mechanisms to accomplish the two foregoing adjustments have been provided with means for rotating the entire lens housing about the center point of the axis of projection which coincides with the optical axis of the center lens group 88. Referring to Figs. 1, 2 and 3, it is to be noted that the lens housing 6 is divided into two sections 170 and 171 of which the former provides the hinge lugs 172 which are engaged by the hinge pin 7 for swinging the lens housing pivotally to one side and away from the forward end of the projector housing 4. To maintain the pivotal lens housing in closed and abutting relation with respect to the main housing 4, the side opposite the hinges of the section 170 of the lens housing 6 is provided, as shown in Fig. 9, with a latch spring 175 having a hole 176 arranged to snap over the fixed pin 177 with the latter engaging in the hole 176 of the spring 175. This will positively hold the relatively movable housings in closed relation and hand operated button 178 may be depressed for engaging the end of the spring 175 by means of the stem 179 to move spring 175 sufficiently inwardly to have the hole 176 clear the end of the fixed pin 177 for opening the lens housing.

Referring again to Figs. 2 and 5 it should be noted that the housing section 170 is provided with a circular end 180 which provides a means for rotatably receiving the circular shoulder portion 181 of the lens housing section 171. To maintain the bores 180 and 181 in operative rotatable engagement, the segmental plates 182 and 183 are secured by screws 184 and 185, respectively, to the section 171 of the lens housing 6. These segmental plates 182 and 183 bear against bosses 186 and 187 formed on and carried by the hinge section 170 of the lens housing 6. As best shown in Fig. 5, a spring 190 is connected between a stud 191 carried by the housing 170 and to the stud 192 secured to the segmental plate 182 and to the rotatable housing section 171. Through the action of the spring, the rotatable housing and all of its lens supporting mechanisms are urged in a clockwise direction as viewed in Fig. 5 at all times. Clockwise rotation, however, of the housing is stopped by means of the conical end 195 of the knurled hand screw 196, the conical end 195 engaging within the opening 197 in a lug 198, the latter being integrally formed and secured to the rotatable section 171 of the lens housing 6. Therefore, by rotating the screw 196, the latter will thread in and out of the threaded hole 199 of the housing section 170 moving the conical end 195 into or out of the opening 197 in the lug 198 and thereby causing rotation of the rotatable section 171 relative to the non-rotatable segment 170 of the lens housing. As hereinbefore explained, the edge of the opening 197 will at all times be maintained in contact with the conical end 195 of the adjusting screw 196 through action of the spring 190.

It should also be noted as best shown in Fig. 5 that the stationary backing plate 42 is secured by means of the screws 43 to the lugs 200 integrally formed with the section 170 of the lens housing 6, so that no other movement of the backing plate 42 other than the swinging of the latter about the pivotal mounting of the lens housing will result. Also, the apertures 200a, 200b and 200c of the fixed backing plate 42 will be held in fixed relation with respect to the passage of the light beams or projected pictures because of its described mounting. The exact external shape of this backing plate 42 is merely as shown for the purpose of providing the clearances necessary when the pivoted lens housing 6 is brought into contact with the stationary lamp housing 4.

Résumé of the three lens projector head

From the foregoing it may be ascertained that the primary purpose of the projector head, which includes the housing 6 and its associated lens carrying and adjusting mechanism, is to project the three frames in accurate superimposed relationship upon a screen. Also to accomplish this result it is necessary to do so for a variable range of distances between the projector and the screen and for this reason the two outside lens groups have been made movable towards and away from the middle group, and to get the proper focus all of the three lens groups have been connected and provided with means for bodily moving the same toward or away from the film plane. Two kinds of lateral motion may be resorted to in moving the outer lenses away from or toward the center lens to effect the proper superimposition of the plurality of images. One means which is considerably used includes various mechanism which move the outer lenses toward and away from the middle lens but wherein the optical axes of the outer lenses remain parallel to the optical axis of the middle or center lenses. With the present projector, the outer lens sets have been mounted and incorporated to move or swing about pivotal points so that the lenses will be turned toward the middle lens group for a near screen and away from the middle lens group for a more distantly located screen. It has also been determined that the best position possible for these pivotal points is at the intersections of the optical axes of the outer lens groups with the outer two film frames of the triplicate picture group as is the case in the present construction. Also, the pivotal axes of the outer lens groups are positioned approximately on the theoretical center line of each respective frame or film picture projected by the particular lens group receiving the light through such picture as mentioned.

Referring to the diagrammatical illustration in Fig. 16, the reference characters 23a, 24a, and 25a represent the corresponding red, blue and green film frames which are aligned to receive the red, blue and green rays of light from the color filters 23, 24, and 25, respectively that are mounted within the frame 22 in the projector. Also, the three groups of lenses are indicated at 87, 88 and 89 while the screen for receiving the pictures and reproducing the same by the reference letter S. In order to bring the three images into focus and superimposed relation, the three lens groups are focused by movement bodily through the agency of a focusing device and such movement will move the center lens group along its optical axis while the outer lens groups will each move directly along their respective optical axes which intersect the center points of the film or frame pictures as indicated by C1 and C2 and which strike the screen S at O. Having placed the pictures in focus, it is now possible to move the outer juxtaposed lens groups toward or away from the center group to effect the vertical superimposition of the images, and by rotating the entire housing with all of the lens groups, horizontal registry of the images is also obtained.

By the method described above, the rays of light from the points C1 and C2 pass through the outer lens groups symmetrically about the axis and to the screen at O and for any particular screen distance the same results will be obtained. The center lens will automatically accommodate the light from its particular picture frame to project the same, and the light will also be symmetrical about the axis of the lenses in this middle lens group.

It is clearly apparent from the above that the present construction is far superior to the frequently used construction wherein the lenses of the outer groups are moved in parallel relation with respect to the axis of the center lenses wherein the aggregate group of rays from the points C1 and C2 would then no longer be centered about the optical axes of the outside lens group which would require the necessity of moving the lenses closer to the center group of lenses in order to obtain the same amount or degree of superimpositioning of the multiple color images and such arrangement would also result in inferior projection.

Film transport mechanism

The film transport mechanism 13 is supported by means of a bracket 201 fastened to the underside of the lamp housing 4 by means of the screws 202, see Fig. 4, which pass into the appropriate bosses 203. The side plate 204 is secured to one end of the bracket 201 by means of screws 205, said plate depending from the upper end of the bracket and being secured at its lower end by means of tubular spacers 206 and bolts 207 (see Figs. 17 and 19), which pass through the spacers and thread into the depending side 208 of the bracket 201. Another housing 209 is secured to the side 208 of the bracket 201 for housing a portion of the film transport mechanism therein as best shown in Figs. 17, 18 and 19.

Referring more particularly to Figs. 18, 19 and 20, which illustrate the film transport mechanism, movement is imparted to the film by means of the drive shaft 210 when the latter is rotated by the hand wheel 211. Shaft 210 is journaled in the side 208 of the bracket 201 and in the side plate 204 and projects into the housing 209. An actuating arm 212 is secured to the end of the shaft 210 within the housing 209 and the arm 212 is normally maintained against the stop 213 by means of a coil spring 214 which has one end looped about the stop 213 with the other end disposed in the hole in the actuating arm 212. The foregoing mechanism will, therefore, maintain the shaft 210 in a definite position at all times and at the same time the shaft 210 may be rotated a limited amount against the action of the spring 214 with the spring returning the shaft and the hand wheel 211 to their initial position whenever the hand wheel 211 is released. The actuating arm 212 is provided with a lug 216 adapted to strike against the pin 213 for limiting the movement of the hand wheel 211 and its associated shaft 210 when the hand wheel is turned against the action of the spring 214.

The drive from shaft 210 is transmitted to a shaft 218 through the instrumentality of the gear segment 219 secured to shaft 210 and the pinion 220 secured to shaft 218. Shaft 218 is provided with a reduced bore 221 adapted for receiving the reduced end 222 of shaft 223 which is aligned with shaft 218. This provides two relatively movable shafts rotatable about a common axis and the shafts are supported in the bearings 224 and 225 carried in the side plate 204 and bracket 208, respectively, with their intermediate support being provided by the connections 221 and 222.

In order to transmit the drive from the shaft 218 to the shaft 223, a lost motion connection is provided which includes a first disc 228 keyed to the shaft 218 and which pivotally supports the dog 229, and a disc 230 that is secured to the shaft 223 and the latter supports a pin 231 in the path of the dog 229 of the disc 228. The dog 229 is normally maintained in fixed relation to the disc 228 and also with respect to the pin 231 by means of the spring 233 which is connected between the ear 234 of the dog 229 and the pin 235 secured to the side of the disc 228. It is to be noted that the ear 234 is made to project at right angles to the face of the dog 229 so as to engage the surface 236 of the disc 228 thereby maintaining the hook portion 237 of said dog in proper spaced relation from the axial center of the shaft 218 for the purpose of hooking onto the pin 231 as the disc 228 is relatively rotated with respect to the disc 230.

The shaft 223 projects into the housing 209 and a rotational limit control latch 240 is secured to the shaft 223 within the housing 209. The latch wheel 240 is provided with the notch 241 which is adapted to receive the end 242 of the lock arm 243. The lock arm 243 is pivotally supported at 244 on the side plate 208 of the bracket 201 and the spring 245 is adapted to normally urge the lock arm 243 in a direction to maintain the stop lug 242 in the notch 241 of the latch wheel 240. The lock arm is provided with a spring-pressed dog 246 pivotally supported at 247 on the lock arm 243 and the spring 248 normally holds the dog 246 against the ear 249 which is part of the lock arm 243 and which is bent at right angles to the face thereof. With this particular construction, the dog 246 provides a driving means for rotating the lock arm 243 whenever the actuating arm 212 is rotated by means of the hand wheel 211, since the dog 246 and actuating arm 212 are disposed in vertical alignment with the dog in the path of the actuating arm.

The drive to the film sprocket 250 is completed by means of the shiftable gear train designated generally by 251 and which is enclosed within the housing 209. A gear unit comprising the bearing member 252 is provided with a slot 253 engageable by the pin 254 secured to the end of the shaft 223. The bearing member 252 journals on the end of the shaft 223 and has a stub shaft portion 255 connected therewith for supporting the gears 256 and 257 for rotation therewith. The outer end of the stub shaft 255 is provided with spaced grooves 258 and 259 to each releasably engage spring-pressed ball 260 in the manner best illustrated in Fig. 19. The outer end of the stub shaft 255 projects through the housing 209 and the hand knob 261 is secured to the projecting end of the shaft. By moving the stub shaft 255 by means of the knob 261 from the groove position 259 to the position 258, the gears 256 and 257 are shifted as a unit to engage the gears 262 and 263 by selection depending upon whether the knob 261 is moved inwardly or outwardly relative to the housing 209.

The other gears 262 and 263 are riveted to the flange 264 of the supporting member 265 and the latter is keyed to the shaft 266, which traverses the housing 209 and the bracket 201 and side plate 204. The drive from the shaft 266 is transmitted to the film sprocket 250 through releasable clutch means 267. The clutch 267 comprises the friction wheel 268 adapted to fit within and to engage the inner conical walls of the cupped sleeve 269, the latter being suitably secured to the inner bore 270 of the drive sprocket 250. The intermediate portion of the shaft 266 is journaled in the bushing 271 adjacent the cupped sleeve 269 and also in a sleeve 272 which is journaled within the bearing 273 carried by the side plate 204.

The sleeve member 272 is also suitably press fitted or otherwise secured within the bore 270 of the film sprocket 250 and at one end thereof the sleeve 272 is provided with the cavity 275 which is closed by means of the hand knob 276 suitably threaded upon the cavity end of the sleeve 272. Shaft 266 projects into the cavity 275 and the spring 277 is confined between the shoulder of the cavity 275 and the washer 278 secured to the end of the shaft 266 by means of the screw 279. It is the action of the spring 277 which urges the shaft 266 laterally toward the left as viewed in Fig. 19, so as to hold the clutch wheel 268 in frictional engagement within the cupped sleeve 269 to normally transmit the drive from the shaft 266 to the rotatable sprocket 250 and its associated mechanisms.

As is necessary in most projectors and for the convenience of threading the film through the projector, the sprocket 250 by the aforementioned arrangement including the clutch mechanism may be disengaged from the drive transmitted thereto by the shaft 266. This is accomplished by providing the collar 280 fixed to the shaft 266 and by engaging the collar 280 by means of a cam portion 281 carried by the lever 282 suitably pivoted at 283 on the side 208 of the bracket 201. The outer end of the lever 282 is provided with a finger tab 284 to permit the easy operation of the lever and the lever is provided with a slot 285 concentrically located with respect to its pivot 283 for the purpose of straddling the shaft 266 to bring the raised cam portion 281 into engagement with the collar 280 for the purpose of shifting the shaft 266 laterally. Obviously, lateral movement of the shaft 266 against the action of the spring 277 will carry the clutch wheel 268 out of frictional engagement with the inner surface of the cupped sleeve 269. The downward limit of the movement of the lever 282 shall be governed by the end of the slot 285, while the upper limit of movement of the lever 282 is stopped by means of the lug 286 which is disposed at right angles to the face of the lever and which is adapted to engage the edge portion 287 of the housing 209.

Therefore, when the lever 282 is operated to interrupt the drive from the shaft 266 to the sprocket 250, it is then possible to turn the knob 276 for rotating the sprocket 250 by means of the sleeve 272 and such rotation may be accomplished in either direction as desired to properly thread the film through the projector.

During the normal operation of the film transport mechanism in advancing the film by means of the hand wheel 211 through the mechanism to the sprocket 250, this driving motion is transmitted by means of the spring belt 288 which passes over the pulley 289 fixed to the cupped sleeve 269 and over the pulley 290 connected with and secured to the reel spindle 291 which drives the takeup reel to wind up the film as the latter is fed through the projector. Also, the film is held in engagement with the sprocket teeth 292 by means of the swingable bracket 293 pivoted at 294 and carrying the two rollers 295 and 295a, respectively, which maintain the film perforations in engagement with the teeth 292 of the sprocket 250. A suitably spring-pressed latch pin 296 has a reduced end 297 which will normally engage into either one of two positions as determined by the holes 298 and 299 carried by the side 208 of the bracket 201. The swingable bracket holds the film in driving position with respect to the sprocket 250 when the latter is in the position wherein the pin 297 is in engagement with the hole 298. By moving the bracket into a position away from the sprocket wherein the pin 297 engages the hole 299, the film may be easily threaded or removed from the machine.

*Operation of the film transport mechanism*

Figure 22:
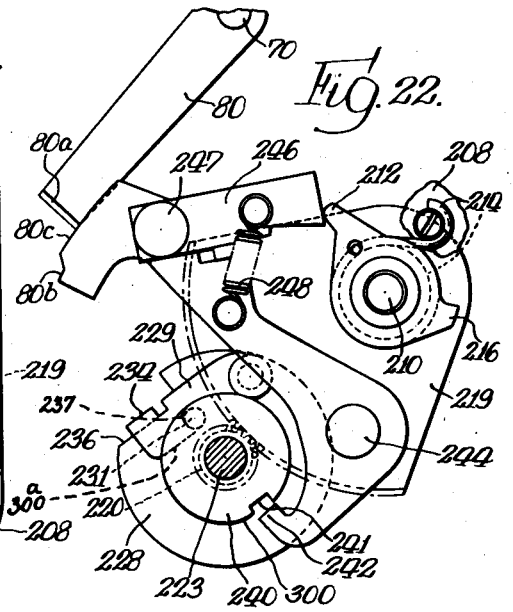
Figure 23:
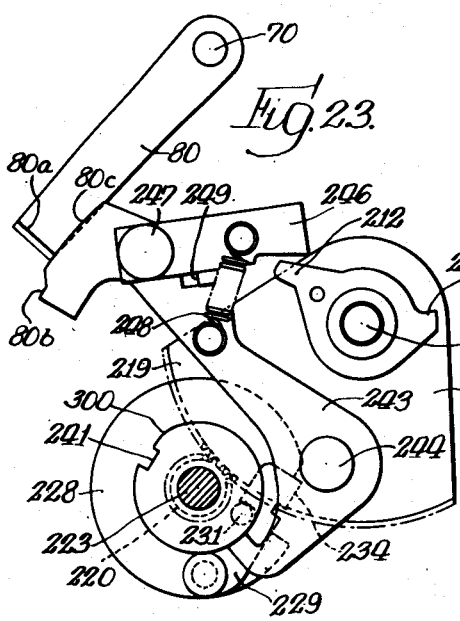
Figure 24:
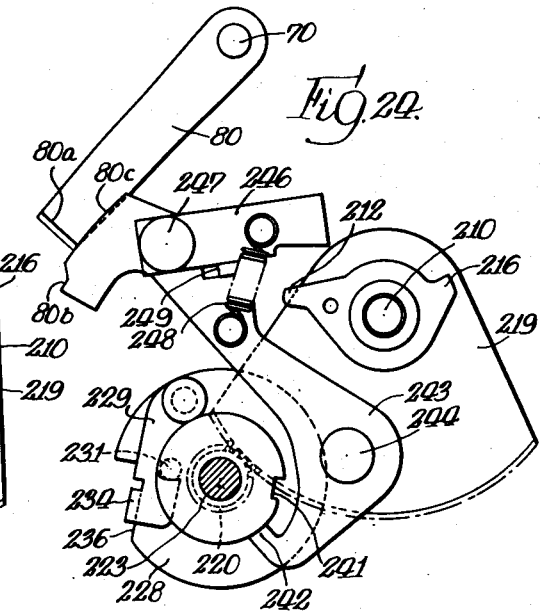

Referring now more particularly to Figs. 21 to 24, inclusive, the operation of the film transport mechanism may best be described as follows: The rotation of the actuator arm 212 will cause the arm to strike the end of the dog 246 which in turn will rock the lock arm 243 about its pivot 244 to move the latch lug 242 of the arm out of the notch 241 of the latch wheel 240. During this movement, the segment gear 219 will revolve the pinion 220, but as best shown in Fig. 21, the dog 229 by its position relative to the pin 231 when turned in clockwise direction has sufficient movement prior to the engagement of the pin 231 to allow the free movement of the parts hereinbefore referred to. As the actuator arm 212 continues its motion and as best seen in Fig. 22, the lock arm is now moved out of engagement with the notch 241 and continued motion of the shaft 210 and its actuator arm 212 will now cause the dog 229 to have its hooked end 237 engage the pin 231. Obviously, as the dog 229 engages the pin 231, shafts 218 and 223 of Fig. 19 will now rotate as a unit to drive the gear group comprising the gears 256 and 257 through the instrumentality of the pin 254 and the slot 253, the latter also being best illustrated in Fig. 19. Also as best shown in Fig. 23, continued rotation of the shaft 210 by the knob 211 will now cause the actuator arm 212 to pass beyond the end of the dog 246 releasing the lock arm 243 and the latter through the action of the spring 245 will then be rotated in a clockwise direction to cause the lug 242 of the arm to engage against the outer concentric surface of the latch wheel 240. At this stage, the arm 243 and its associated mechanisms will be held against rotation and in the fixed position shown in Fig. 23, while continued rotation of the shaft 210 now additionally drives the gears 256 and 257 through the segmental gear 219 and pinion 220 and the connected shafts 218 and 223.

Rotation of the shafts 218 and 223 as a unit is then continued until the notch 241, best shown in Fig. 24, will again receive the lug 242 of the arm 243. To insure positive engagement of the lug 242 within the slot 241, the peripheral surface of the latch wheel 240 is flattened substantially as shown at 300 to drop the lug 242 radially into the path of the wall of the notch 241 oppositely disposed with respect to the surface 300. It is therefore seen that each movement of the hand wheel 211 through the mechanism described will cause one complete revolution of the shafts 218 and 223 as determined by the notch 241 on the latch wheel 240, and its relation to the lug 242 on the lock arm 243.

Also, the reverse motion of the disc 228 carrying the dog 229 is greater than one revolution in view of the fact that the dog as best shown in Fig. 21 must first advance to engage the pin 231 and thereafter rotate the pin through 360 degrees. It is for this reason that the dog 229 is resiliently maintained against the face 236 of the disc 228 by means of the spring 233 inasmuch as the reverse motion of the disc 228 will then allow the surface 300a contiguous with the hook portion 237 of the dog to engage and snap past the pin 231 during the reversal of movement of the shaft 218 carrying the disc 228. Obviously, the disc 228 and its dog 229 will then be returned to the position illustrated in Fig. 21, after the pinion 220 and its driving gear segment 219 are returned to the position initially shown in Fig. 21, wherein the actuator arm 212 will abut the stop 213 which is the initial and inoperative position of the film transport mechanism.

The gear mechanism indicated generally at 251 in Fig. 19 has been devised for the purpose of providing means for advancing the film either three frames at a time or by means of a single frame whenever black and white individual frame picture projection is desired. It is for this purpose that the shifting device as best illustrated in Fig. 19 has been incorporated. The drive as now shown with the knob 261 moved adjacent the housing 209 will provide the necessary rotation through the gears 256 and 262 for rotating the sprocket 250 an amount whereby the lineal movement of the film will bodily advance successive groups of three frames of each photographed object for the purpose of color projection.

Whenever the knob 261 is moved outwardly and away from the housing 209 into its other position, the drive from shaft 223 through the pin 254 and notch 253 will now be transmitted through the pinion 257 and gear 263 providing a different gear ratio whereby the drive to shaft 266 will advance the film sprocket 250 to the extent whereby the film will be advanced a single frame at a time whenever black and white single frame projection is desired. Whenever the projector is to be used for such a single frame projection as for black and white film, the filter frame 22 is removed from the machine and the frame illustrated in Fig. 15 with the single aperture is then inserted between the guide members 26 to permit single frame projection. The aperture in the replaceable frame may be provided in any one of three positions corresponding to the three different lens groups, etc., but as shown, the opening is located to pass the light from the center group 88. The use of a replacement frame of the class described is generally known in the art.

With the transport mechanism just described it is possible by means of the reductions imposed through the various gears to obtain a high speed film advance which will be great enough so as to be substantially imperceptible to the eye without causing annoyance to the observers during screen projection. It is to be noted that the film advance is controlled by approximately a quarter turn of the knob 211 making it simple for an operator to obtain the high speed through the transport gear mechanism. It is for this reason that the present projector has made possible the elimination of shutter mechanism, adding to the simplicity of the entire projector with a corresponding saving in the cost of production by eliminating such additional mechanism.

Since each picture transposition requires only about a 90 degree turn of the knob 211 and the latter is automatically returned to its initial position each time by the coil spring 214, only a slight movement of the hand efficiently changes the projected pictures.

*Pressure plate release mechanism*

It is desirable to release all pressure on the film during the advance thereof by means of the film transport mechanism and this is accomplished through the agency of the arm 80 rockably carried on the shaft 70 which provides the instrumentality for retracting the pressure plate 41 to allow free passage of the film during transposition between the pressure plate 41 and the fixed backing plate 42, in the manner that was hereinbefore fully described.

Movement of shaft 70 by means of the arm 80 is accomplished by means of the contact ear member 80a which is turned at right angles to the face of the arm 80 and which operates within the housing 209 to normally bear against the outer surface 80b of the lock arm 243. The ear 80a is normally maintained against the surface of the end of the lock arm 243 through the action of the resilient means associated with the pressure plate mechanism.

Referring now to Fig. 21, it is seen that the initial movement of the actuator arm 212 for rocking the lock arm 243 will cause the end 80a of the arm 80 to rise from the surface 80b to the surface 80c which is concentric with respect to the pivot 244 of arm 243 prior to any film motion, inasmuch as the dog 229 has not yet engaged the pin 231, and obviously, as the ear 80a rides upon the surface 80c, shaft 70 will be rocked in the proper direction by means of the arm 80 to move the pressure plate 41 away from its film positioning relation against the backing plate 42. With this mechanism in combination with the film transport means, a positive release of the film is first effected prior to any lineal movement thereof which is the ideal situation.

*Projector cooling system*

In furtherance of the endeavor to produce a projector having projection properties approaching the ultimate theoretical ideal picture reproduction, the present machine also embodies a new and highly efficient cooling system to positively insure against damage to the film and to subject the film only to temperatures ranging in the vicinity of 100 degrees F. This definitely reduces film expansion substantially to a minimum and certainly is one of the most important attributes of this projector in spite of the fact that the lamp herein used as a light source is of extremely high wattage. The lamp utilized in the present design is of the 750 watt type providing a brilliant reproduction of the superimposed color images on the screen.

The cooling system incorporates a small electric motor 301, suitably mounted by means of the bracket 302 to the underside of the lamp housing 4 by means of the screws 303. The drive shaft 304 of the motor passes into the blower housing 305 for the purpose of driving the blower 306 which is fixed to the motor drive shaft. The blower 306 utilized is best illustrated in Figs. 2 and 3 comprising the peripherally disposed blades 307 mounted concentrically with respect to the air opening 308 located in the side of the blower housing 305. The air is drawn into this opening and directed along the blower duct 309 as best viewed in Figs. 2 and 3, and a suitable dividing baffle 310 is located in the blower duct 309 for substantially dividing the air stream from the blower into two paths to enter the lamp housing openings 311 and 312, respectively. As the air stream enters the opening 311 of the lamp housing, a pair of baffles 313 and 314 guide the air stream into an opening 315 located adjacent the lower end of the lamp chimney 16 as best illustrated in Figs. 1 and 14. From the opening 315 the air surrounds the lamp and passes directly therealong upwardly through the chimney and out through the opening 316 provided in the lamp housing cover 5. The opening 316 is approximately the same size as the open end of the lamp chimney 16 as best illustrated in Fig. 1. Some of the air will be dispersed out of the lamp chimney stream when the air passes the openings 317 and 318 normally provided adjacent the center of the lamp for the purpose of light transmission. Obviously, the dispersed air will help in cooling the other members of the light transmission system and eventually this dispersed air will rise to the top of the lamp housing and some of it will also pass out of the opening 316 in the lamp housing cover 5. It is to be noted that a greater portion of the air is directed up the lamp chimney through the appropriate location of the diverting baffle 310 and the remainder of the air from the blower passes on and enters the opening 312 hereinbefore mentioned for cooling the forwardly located units which are disposed adjacent the path of the picture film.

The second air stream is made to enter the housing at a point forwardly of the condensers 18 and 19, and just to the rear of the color filters 23, 24 and 25, the air stream also passing alongside of the heat absorbing glass 20 and upwardly with respect to the housing to enter the underside of the lamp housing cover 5. This upward rush of air which has substantially fulfilled its cooling purpose is now directed by reason of the shape of the underside of the cover to the rear of the lamp housing around the upper end of the lamp chimney 16, this air being deflected thereafter by the downturned portion 320 of the lamp cover 5. This air then sweeps downwardly along the rearwardly inclined wall 321 of the lamp housing 4 and through a plurality of baffles 322 and 323, which together act as further means for dissipating the heat from the lamp housing to the air passing therealong.

The action of the second stream of air which passes along the hottest portion of the lamp housing, namely, underneath the cover 5 will act as a means for drawing off and dispelling most of the hot air to eliminate any stagnet pockets that may become extremely hot from the heat radiated thereto from the lamp 15. This action is also supplemented to a certain extent by the suction of the air passing across the space from the top of the lamp chimney 16 to the cover opening 316 which will also aid in dissipating the hottest air from within the lamp housing. The exterior of the lamp housing 4 is also provided with additional ribs 324 and 325 such as shown in Fig. 3 for the purpose of dissipating heat from the lamp housing. Additional ribbing or cooling fins are also provided at 326 on the outer surface of the lamp housing cover 5. The above ribs or cooling fins are also for the purpose of guarding the operator of the projector from accidental burns. The ribs act to reduce the surface contact of the hands, etc., with the projector housing to reduce the danger of possible severe burns.

To further expel the hot air from the second air stream, another opening or vertical slot 326a has been provided, as shown in Fig. 2, in one side of the lamp housing 4 and substantially opposite to the inlet opening 312. If desired, another opening similar to 326a may also be provided in the wall of the lamp housing 4 and adjacent the inlet opening but above the chamber of the duct 309.

One other feature incorporated in the device relates to the means for tilting the projector relative to its base 2 and about the pivotal support or connection 1 and which is easily accomplished by the novel construction of leveling screw mechanism generally indicated at 3 in Figs. 1, 3 and 25. This particular tilting mechanism comprises a sleeve nut 329 provided with a knurled hand knob 330, the sleeve nut being internally threaded with left and right hand threads for receiving the end portions of the studs 331 and 332 which are also oppositely threaded for coaction with the respective threads within the sleeve nut 329. The stud 331 is pivotally connected to the main housing 4 by means of the pin 333 mounted on the bracket 334 and the latter is suitably fastened to the under side of the lamp housing 4. Similarly, the stud 332 is pivotally supported on the pin 335 and the latter is carried in the bracket 336 which is conveniently secured by any suitable means to the under surface of the top of the base 2. This particular construction of leveling screw mechanism for tilting the projector can effect relatively fine adjustments with comparatively fast movement by providing the studs 331 and 332 with relatively finely pitched threads to produce the fine adjustments sought.

The foregoing completes the description of the new and novel features combined and contained substantially as shown in the drawings and as embodied in the projector of the present invention. No particular reference has been made to the manner and means in which some of the members of the condenser system, etc., are supported nor in the manner in which the lamp is connected to the housing inasmuch as these constructions are well known to those skilled in the art. Likewise the projector is provided with suitable light shielding diaphragms, one of which is shown at 327 in Fig. 2 and such dividers or light shields are usually supplied for the prevention of light diffusion between the respective triple projection members utilized in color photography projection or the like.

The foregoing description relating to the preferred embodiment of the present projector as disclosed in the drawings may obviously permit various modifications in the preferred construction that presumably will not depart from the general scope and field of the present invention. Hence, it is to be understood that the present projector is not to be limited to the exact form, construction, arrangement or combination of parts as specifically referred to and described, or for the particular uses mentioned, excepting insofar as shall be governed by the appended claims.

What I claim as new and desire to secure by Letters Patent is:

1. A plural lens mount for a film projector adapted for multiple color picture projection, comprising a housing, a plurality of lens groups carried by said housing and arranged in juxtaposed relation therein, one of said lens groups being disposed with its optical axis coincident with the projection axis of the projector, bars supporting the other lens groups on either side of said one lens group to swing about fixed pivots, the pivot of each bar being disposed in the same plane as the film and at a point on a line bisecting the corresponding film frame projected by each of the latter groups, respectively, whereby superimposed registry of the projected images is obtainable.

2. A plural lens mount for a film projector adapted for multiple color picture projection, comprising a housing, a plurality of lens groups carried by said housing and arranged in juxtaposed relation therein, one of said lens groups being disposed with its optical axis coincident with the projection axis of the projector, the other lens groups being supported on either side of said one lens group to swing about fixed pivots, the pivot of each group being disposed in the same plane as the film and at a point on a line bisecting the corresponding film frame projected by each of the latter groups, respectively, whereby superimposed registry of the projected images is obtainable, connecting means between the middle lens group and said other lens groups, whereby all of the lens groups move longitudinally in unison, and means for moving the middle lens group bodily fore and aft of said housing to focus the images projected thereby on a screen.

3. A plural lens mount for a film projector adapted for multiple color picture projection, comprising a housing, a plurality of lens groups carried by said housing and arranged in juxtaposed relation therein, one of said lens groups being disposed with its optical axis coincident with the projection axis of the projector, the other lens groups being supported on either side of said one lens group to swing about fixed pivots, the pivot of each said other group being disposed in the same plane as the film and at a point on a line bisecting the corresponding film frame projected by each of the latter groups, respectively, whereby superimposed registry of the projected images is obtainable in one transverse direction, connecting means between the middle lens group and the other lens groups, whereby all of the lens groups move fore and aft in unison, means to move the middle lens group fore and aft to focus the images projected thereby upon a screen, and means for rotating the entire lens groups bodily about the optical axis of said one central lens group to obtain superimposed registry of the projected images in another transverse direction at right angles to said first transverse adjustment.

4. A plural lens mount for a film projector adapted for multiple color picture projection, comprising a housing, a plurality of lens groups carried by said housing and arranged in juxtaposed relation therein, one of said lens groups being disposed with its optical axis coincident with the projection axis of the projector, the other lens groups being supported on either side of said one lens group to swing about fixed pivots, the pivot of each said other group being disposed in the same plane as the film and at a point on a line bisecting the corresponding film frame projected by each of the latter groups, respectively, whereby superimposed registry of the projected images is obtainable in one transverse direction, means for rotating the entire lens groups bodily about the optical axis of said one central lens group to obtain superimposed registry of the projected images in a transverse direction at right angles to said first transverse adjustment, means connecting the middle lens group with the other lens groups, whereby when the middle lens group is moved fore and aft the other lens groups are moved simultaneously therewith, and means for moving the middle lens group and therewith said other lens groups bodily fore and aft of said housing to focus the images projected thereby on a screen.

5. In a film projector having a plurality of lens groups to superimpose a like number of images on a screen in multicolor picture reproduction, supporting bars for said lens groups, two of which bars are pivotally mounted on fixed pivots, and one of said lens groups being mounted for fore and aft movement along its own optical axis and coincident with the axis of projection of said projector, the other of said lens groups being connected to said one lens group for fore and aft movement in unison, and also being mounted for movement toward and away from said one lens group to obtain registry of said images, each of said lens groups having a single actuating means adapted for moving its lenses along a path coincident with their optical axis and with the latter disposed along a line extending from the theoretical mid point of the corresponding film image frame and intersecting the optical axis of the center lens group substantially in the plane of the screen.

6. In a film projector having a plurality of lens groups to superimpose a like number of images on a screen in multicolor picture reproduction, supporting means for said lens groups, one of said lens groups being mounted for fore and aft movement along its own optical axis and coincident with the axis of projection of said projector, the other of said lens groups being connected to said one lens group for fore and aft movement in unison therewith, and also being pivotally supported on fixed pivots in the focal plane of said film and swingable toward and away from said one lens group to obtain registry of said images, each of said lens groups having a single actuating means adapted for moving its lenses along a path coincident with their common optical axis and with the latter disposed along a line extending from the theoretical mid point of the corresponding film image frame and intersecting the optical axis of the center lens group substantially in the plane of the screen.

7. In a film projector having a plurality of lens groups to superimpose a like number of images on a screen in multicolor picture reproduction, supporting means for said lens groups, one of said lens groups being mounted for fore and aft movement along its own optical axis and coincident with the axis of projection of said projector, the other of said lens groups being pivotally supported on fixed pivots in the focal plane of said film and swingable toward and away from said one lens group to obtain registry of said images, each of said latter lens groups having actuating means adapted for moving its lenses along a path coincident with their common optical axis and with the latter disposed along a line extending from the theoretical mid point of the corresponding film image frame and intersecting the optical axis of the center lens group substantially in the plane of the screen, connecting means for joining all of said lens groups to move the same bodily together fore and aft of the projector for focusing the images, and said actuating means including symmetrical operating units to positively move the outer lens groups toward and away from said center lens group by equal increments and independently of said focusing adjustment.

8. A plural lens mount for a film projector adapted for multiple color picture projection, comprising a lens housing, a plurality of lens groups carried by said housing and arranged in juxtaposed position therein, one of said lens groups being disposed with the optical axis coincident with the projection axis of the projector, arms pivoted on fixed pivots supporting the other lens groups on either side of said one lens group to swing about the respective pivots of the arms, slides for said lens groups, means to adjust said slides longitudinally of the housing, connecting means between the slide for the middle lens group and the other slides, whereby all of the slides move in unison, rotatable actuating means for swinging said arms and therewith said other lens groups apart, and actuating means for moving said middle slide and therewith the other slides and all of the lens groups in fore and aft directions.

9. A plural lens mount for a film projector adapted for multiple color picture projection, comprising a lens housing having a machined vertical surface extending lengthwise of the housing, a middle lens mount slide guided thereon for movement fore and aft of the housing, upper and lower lens mount arms pivotally mounted contiguous with said surface on fixed pivots, an upright bar secured to said housing, cooperating with said surface to guide said arms to move in a vertical plane, lens mounts secured to said slide and to said arms and adjustable lengthwise thereof, means connecting said lens mounts whereby they move in unison fore and aft, and independent means to swing said arms and therewith the lens mounts carried thereby toward and away from each other.

WILLIAM A. LEBUS.